United States Patent
Ravindra et al.

(10) Patent No.: US 10,100,813 B2
(45) Date of Patent: Oct. 16, 2018

(54) SYSTEMS AND METHODS FOR OPTIMIZING OPERATION OF A WIND FARM

(71) Applicant: General Electric Company, Schenectady, NY (US)

(72) Inventors: Vishal Cholapadi Ravindra, Bangalore (IN); Akshay Krishnamurty Ambekar, Bangalore (IN); Siddhanth Chandrashekar, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/551,125

(22) Filed: Nov. 24, 2014

(65) Prior Publication Data

US 2016/0146190 A1 May 26, 2016

(51) Int. Cl.
*F03D 7/04* (2006.01)
*F03D 9/00* (2016.01)

(52) U.S. Cl.
CPC ............ *F03D 7/048* (2013.01); *F03D 9/005* (2013.01); *F05B 2270/20* (2013.01)

(58) Field of Classification Search
None
See application file for complete search history.

(56) References Cited

U.S. PATENT DOCUMENTS

| | | | |
|---|---|---|---|
| 5,531,406 A | 7/1996 | Redekopp | |
| 7,484,363 B2 | 2/2009 | Reidy et al. | |
| 7,941,304 B2 | 5/2011 | Gundling | |
| 8,050,899 B2 * | 11/2011 | Giguere | F03D 11/04 60/39.34 |

(Continued)

FOREIGN PATENT DOCUMENTS

| | | |
|---|---|---|
| EP | 2557311 A1 | 2/2013 |
| WO | WO 03/064853 A1 | 8/2003 |

(Continued)

OTHER PUBLICATIONS

Related U.S. Appl. No. 14/493,455, filed Sep. 23, 2014.
Related U.S. Appl. No. 14/493,464, filed Sep. 23, 2014.
Article—Towards Wind Farm Performance Optimization through Empirical Models, Aerospace Conference, 2014 IEEE, Mar. 1-8, 2014, Evans et al., pp. 1-12.
Abstract Only—Anticipatory Control of Wind Turbines with Data-Driven Predictive Models, Energy Conversion, IEEE Transactions, Sep. 2009, Kusiak et al., vol. 24, Issue 3, pp. 766-774.

(Continued)

*Primary Examiner* — Ronald Hartman, Jr.
(74) *Attorney, Agent, or Firm* — GE Global Patent Operation; Nitin N. Joshi (57) ABSTRACT

Methods and systems for optimizing operation of a wind farm are disclosed. The method includes providing a farm-level wake model for the wind farm based on historical wake parameters corresponding to reference sets of interacting wind turbines in the wind farm. Another step includes monitoring one or more real-time wake parameters for wind turbines in the wind farm. A further step includes identifying at least two interacting wind turbines from the reference sets based on the wake parameters. Another step includes determining a wake offset angle between the interacting wind turbines as a function of at least one of a wind direction, a geometry between the interacting wind turbines, or a wake meandering component. The method also includes continuously updating the wake model online based at least partially on the wake parameters and the wake offset angle and controlling the interacting wind turbines based on the updated wake model.

20 Claims, 5 Drawing Sheets (56) References Cited

U.S. PATENT DOCUMENTS

| | | | |
|---|---|---|---|
| 8,295,987 B2 | 10/2012 | Gadre et al. | |
| 8,853,877 B1* | 10/2014 | Zalar | F03D 7/048 |
| | | | 290/44 |
| 9,165,092 B2* | 10/2015 | Hazra | G06F 17/50 |
| 9,189,570 B2* | 11/2015 | Dilkina | G06Q 10/04 |
| 9,201,410 B2* | 12/2015 | Ambekar | G05B 13/04 |
| 2006/0131889 A1 | 6/2006 | Corten et al. | |
| 2007/0031237 A1 | 2/2007 | Bonnet | |
| 2008/0086281 A1 | 4/2008 | Santos | |
| 2008/0317598 A1* | 12/2008 | Barbu | F03D 7/022 |
| | | | 416/9 |
| 2009/0192868 A1 | 7/2009 | Rajiv et al. | |
| 2010/0152905 A1 | 6/2010 | Kusiak | |
| 2010/0274400 A1 | 10/2010 | Ormel et al. | |
| 2010/0274401 A1 | 10/2010 | Kjaer et al. | |
| 2011/0020122 A1 | 1/2011 | Parthasarathy et al. | |
| 2011/0049883 A1 | 3/2011 | Hatch et al. | |
| 2011/0106680 A1 | 5/2011 | Vittal et al. | |
| 2011/0145277 A1 | 6/2011 | Gadre et al. | |
| 2011/0175356 A1 | 7/2011 | Nielsen et al. | |
| 2011/0223018 A1 | 9/2011 | Srinivasan et al. | |
| 2012/0053983 A1 | 3/2012 | Vittal et al. | |
| 2012/0083933 A1 | 4/2012 | Subbu et al. | |
| 2012/0133138 A1 | 5/2012 | Sorensen et al. | |
| 2012/0279288 A1* | 11/2012 | Frederiksen | F03D 7/0204 |
| | | | 73/112.01 |
| 2013/0166082 A1* | 6/2013 | Ambekar | G05B 13/04 |
| | | | 700/287 |
| 2013/0184838 A1 | 7/2013 | Tchoryk, Jr. et al. | |
| 2013/0255363 A1* | 10/2013 | Merida | F03D 7/048 |
| | | | 73/112.01 |
| 2013/0300115 A1 | 11/2013 | Seem et al. | |
| 2013/0332220 A1* | 12/2013 | Nielsen | F03D 1/003 |
| | | | 705/7.21 |
| 2014/0028495 A1 | 1/2014 | Schroeder et al. | |
| 2014/0037447 A1* | 2/2014 | Attia | F03D 7/048 |
| | | | 416/1 |
| 2014/0193257 A1 | 7/2014 | Ormel et al. | |
| 2014/0336833 A1 | 11/2014 | Marinopoulos et al. | |

FOREIGN PATENT DOCUMENTS

| | | |
|---|---|---|
| WO | WO 2013/152776 A1 | 10/2013 |
| WO | WO 2014/104978 A1 | 7/2014 |

OTHER PUBLICATIONS

Abstract Only—Fuzzy Modeling Techniques and Artificial Neural Networks to Estimate Annual Energy Output of a Wind Turbine, Renewable Energy, 2010, Jafarian et al., vol. 35, Issue 9, pp. 2008-2014.

European Search Report and Written Opinion issued in connection with corresponding EP Application No. 15195442.7-1607 dated Apr. 6, 2016.

\* cited by examiner

SYSTEMS AND METHODS FOR OPTIMIZING OPERATION OF A WIND FARM

FIELD OF THE INVENTION

Embodiments of the present disclosure relate generally to wind turbines, and more particularly to online systems and methods for optimizing operation of a wind farm.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Such wind turbines are typically located in a wind farm spread across a specific geographical region such that the wind passing over the region causes the blades associated with the wind turbines to rotate. Traditionally, wind farms are controlled in a decentralized fashion to generate power such that each turbine is operated to maximize local power output and to minimize impacts of local fatigue and extreme loads. However, in practice, such independent optimization of the wind turbines ignores farm-level performance goals, thereby leading to sub-optimal performance at the wind farm-level. For example, independent optimization of the wind turbines may not account for aerodynamic interactions such as wake effects between neighboring turbines within the wind farm that may affect a farm-level power output.

Typically, wake effects include a reduction in wind speed and increased wind turbulence at a downstream wind turbine due to a conventional operation of an upstream wind turbine. The reduced wind speed causes a proportional reduction in a power output of the downstream wind turbine. Moreover, the increased turbulence increases the fatigue loads placed on the downstream wind turbine. Several studies have reported a loss of more than 10% in the annual energy production (AEP) of the wind farm owing to the wake effects between neighboring independently optimized wind turbines within the wind farm.

Accordingly, some currently available approaches attempt to optimize power generation at the wind farm-level by mitigating an impact of the wake effects through a coordinated control of the wind turbines in the wind farm. Typically, mitigating the wake effects involves accurately modeling the wake effects experienced at different wind turbines in the wind farm. For example, empirical or semi-empirical thrust-based, and/or high fidelity physics-based models may be used to model the wake effects between the aerodynamically interacting wind turbines in the wind farm.

Conventionally, the empirical or semi-empirical models (engineering wake models) are generated based on field-experiment data and/or historical wind information. Accordingly, these models may be used to design the layouts of wind farms so as to optimize one or more performance goals before installation of the wind turbines. Alternatively, these models may be used to optimize performance of the wind farm subsequent to the installation.

One optimization approach, for example, employs the engineering wake models to determine control settings for the wind turbines. Particularly, the engineering wake models determine the control settings so as to operate upstream turbines at lower efficiencies, which in turn, allows for greater energy recovery at the downstream turbines. Another approach uses the engineering wake models for adjusting a yaw alignment of the upstream turbines relative to an incoming wind direction to steer the resulting wake effects away from the downstream turbines.

However, the conventional engineering models do not account for prevailing wind inflow and other ambient conditions such as atmospheric boundary layer stability and longitudinal turbulence intensity. As the ambient conditions over the wind farm tend to change frequently, the wake models estimated using the engineering wake models may be inaccurate for use during real-time implementation. Inaccurate modeling of the wake conditions, in turn, may result in use of incorrect control settings for the wind turbines in the wind farm. Thus, the conventional optimization approaches using the engineering wake models usually provide only a marginal improvement in the farm-level performance output.

Another optimization approach employs hi-fidelity wake models, for example, based on computational fluid dynamics modeling. Such wake models may provide greater accuracy in modeling wake interactions. The hi-fidelity models entail measurement and analysis of a wide variety of parameters that necessitate additional instrumentation, complex computations, and associated costs. The cost and complexity associated with the hi-fidelity models, therefore, may preclude wider use of these models in every turbine in the wind farm and/or for real time optimization of wind farm operations.

Still further approaches includes optimizing the control set points sent to upstream turbines, that are found to wake other downstream turbines, based on predictions from a wake model, in order to mitigate the wind speed deficit due to wake at downstream turbines. Such models are typically referred to as a pair-wise model that predicts the velocity deficit ratio between the upstream and the downstream turbines. One of the inputs to such models is the line joining the hub center of the upstream turbine and the center of the wake at the downstream turbine rotor plane and the line connecting the rotor plane centers of the two turbines. Previous pair-wise models were offline regression models, where the angular offset is calculated based on the assumption that the wake center coincides with the average wind direction projected at the downstream turbine rotor plane. Such an assumption, however, does not take into account the meandering effect of the wake due to lateral and vertical components of wind speed. Hence, in such models, the wake offset angle, due to lack of consideration of the meandering effect, might indicate that a turbine is waked while in reality it is not and vice versa. This in turn might penalize the upstream turbine control set-point to be conservative or aggressive, when the wake predictions are inaccurate. Furthermore, as the pair-wise regression model is an offline model, and is the same model irrespective of the terrain, land use around the turbine pair, and/or ambient conditions such as the turbulence level or atmospheric boundary layer state.

Accordingly, there is a need for an online adaptive farm-level wake model that takes into account the land use, atmospheric conditions and/or ambient conditions around the turbine pair, in addition to the meandering component between the waked pair of wind turbines.

BRIEF DESCRIPTION OF THE INVENTION

Aspects and advantages of the invention will be set forth in part in the following description, or may be obvious from the description, or may be learned through practice of the invention.

In accordance with one aspect of the present disclosure, a method for optimizing operation of a wind farm is disclosed. The method includes providing a farm-level wake model for the wind farm based on historical wake parameters corresponding to reference sets of interacting wind turbines in the wind farm. Another step includes monitoring one or more real-time wake parameters for wind turbines in the wind farm. The method also includes identifying at least two interacting wind turbines from the reference sets of interacting wind turbines based on the real-time wake parameters. A further step includes continuously updating the farm-level wake model online based at least partially on the real-time wake parameters. The method also includes controlling the interacting wind turbines based on the updated farm-level wake model.

In another aspect, the present disclosure is directed to a method for optimizing operation of a wind farm. The method includes monitoring, via one or more sensors, one or more wake parameters for wind turbines in the wind farm. Further steps include identifying at least two interacting wind turbines from the wind turbines based on the monitored wake parameters. The method further includes determining a wake offset angle between the interacting wind turbines as a function of one or more of an average wind direction, geometry between the two interacting wind turbines, or a wake meandering component. Another step includes developing a farm-level wake model for the interacting wind turbines based at least partially on the monitored wake parameters and the wake offset angle. Thus, the method also includes controlling the interacting wind turbines based on the farm-level wake model.

In yet another aspect, a system for optimizing operation of a wind farm is disclosed. The system includes one or more sensors configured to measure a plurality of wake parameters for one or more of the plurality of wind turbines in the wind farm and a farm controller operatively coupled to the one or more sensors. The farm controller is configured to perform one or more operations. For example, in one embodiment, the operations include: identifying at least two interacting wind turbines from the wind turbines based on the monitored wake parameters, determining a wake offset angle between the interacting wind turbines as a function of one or more of an average wind direction, geometry between the two interacting wind turbines, or a wake meandering component, developing a farm-level wake model for the interacting wind turbines based at least partially on the monitored wake parameters and the wake offset angle using turbine mounted as well as external sensors, and controlling the interacting wind turbines based on the farm-level wake model.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The following description presents exemplary embodiments of online systems and methods for optimizing operation of a wind farm. Particularly, embodiments illustrated herein disclose an online, farm-level wake model that continually adapts model coefficients using real-time data collected from one or more sensors that may be located on or off the wind turbine. The data may include wake parameters including ambient conditions, geometrical layout of the wind farm, and/or operational information corresponding to the wind turbines. The ambient conditions, for example, may include prevailing wind direction, wind speed detected at an upstream wind turbine (upstream wind speed), wind speed detected at a downstream wind turbine (downstream wind speed), wind shear, wind veer, temperature, humidity, and/or pressure. The wake parameters may further include operating data and control settings such as a tip speed ratio, a pitch angle, a yaw alignment, a generator speed, a power output, a torque output, a thrust measurement, and/or operational states of individual wind turbines that provide information regarding any wind turbines in the wind farm. Additionally, the wake parameters may also include known geometric layout of the wind farm including information corresponding to terrain of the wind farm, number of neighboring turbines, actual turbine locations, and/or relative locations of the downstream and upstream wind turbines.

Further, embodiments of the present disclosure present a data-augmented approach that uses real-time wake parameters for generating and continuously updating a robust farm-level wake model. Specifically, the data-driven approach uses the wake parameters to identify aerodynamically interacting sets of wind turbines and estimate corresponding (set-wise) wake interactions. The set-wise wake interactions, in turn, are used to generate the farm-level wake models in real-time. The data-augmented approach may determine a wake offset angle between the interacting wind turbines as a function of at least one or more of an average wind direction, geometry between the sets of wind turbines, and/or a wake meandering component. Use of prevailing ambient conditions and current operational states of individual turbines, as well as the wake offset angle, enables more accurate detection of wake interactions being experienced in real-time at the downstream wind turbines, thereby allowing for determination of a more accurate online farm-level wake model that is continuously adapted in real-time. In addition, the farm-level wake model can be adapted online even without the accurate calculation of the wake offset angle.

Figure 1:
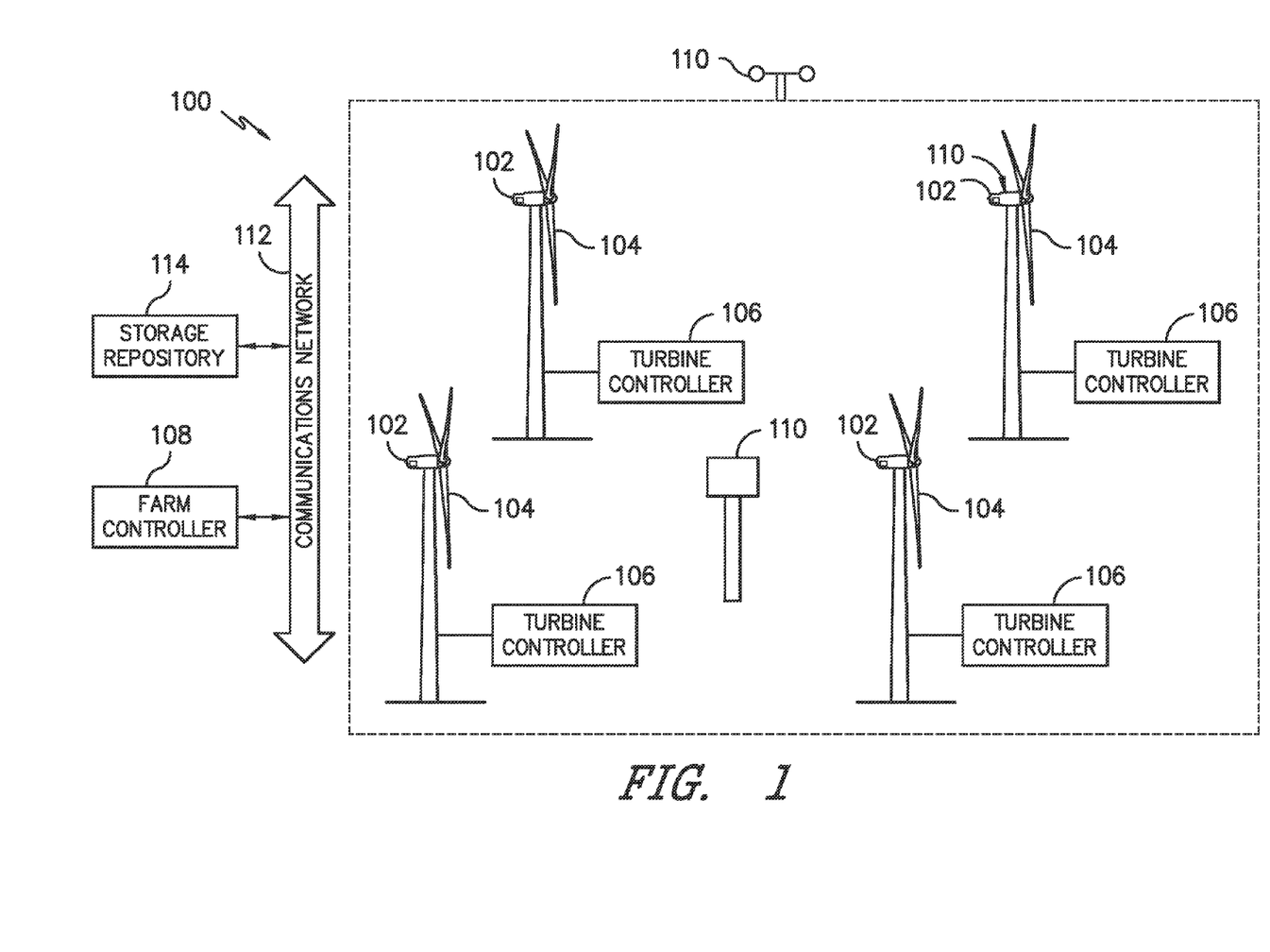
FIG. 1 illustrates a schematic diagram of one embodiment of a wind farm according to the present disclosure.

Referring now to the drawings, FIG. 1 illustrates an exemplary wind farm 100 according to aspects of the present disclosure. In one embodiment, the wind farm 100 includes a plurality of wind turbines 102 arranged in a desired geometrical layout. For example, the wind turbines 102 may be arranged randomly, in a single row, or in an array of rows and columns using one or more layout optimization algorithms. Generally, the optimization algorithms may be designed to maximize positive effects of expected wind velocity and direction on the performance goals such as annual energy production (AEP), while minimizing negative effects such as an increase in fatigues loads associated with each of the individual wind turbines 102.

In one embodiment, each of the wind turbines 102 includes one or more energy conversion modules such as rotor blades 104, a step-up gearbox (not shown), and a power generator (not shown) that converts wind energy into usable electrical energy. Additionally, the wind turbines 102 also include blade pitch mechanisms (not shown) to regulate turbine power output and rotor speed, yaw mechanisms (not shown), and one or more monitoring devices (e.g. sensors) that work cohesively with other components of the wind turbines 102 to swivel and align the rotor blades 104 in line and/or or relative to the prevailing wind direction. Moreover, the wind turbines 102 may also include cooling units (not shown) to prevent components of the wind turbines 102 from overheating, braking systems (not shown) to stop the rotor blades 104 from rotating when desired, and nacelles (not shown) for protecting the different components of the wind turbines 102 from environmental factors.

Typically, the rotor blades 104 of the wind turbines 102 are aligned in a substantially similar direction, for example, the direction of incoming wind during operation of the wind turbine 102. Such a blade alignment, however, positions certain downstream wind turbines 102 behind certain upstream wind turbines 102 in the wind farm 100, thus resulting in wake effects that adversely impact operations of the downstream wind turbines 102. For example, the wind blowing across the rotor blades 104 of upstream wind turbines 102 causes rotation of the corresponding blades 104. The rotating blades 104 convert at least some of the kinetic energy of the incoming wind into mechanical energy, thus reducing the wind speed experienced at the downstream wind turbine 102, while further increasing the turbulence.

Since power output of wind turbines 102 is proportional to incoming wind velocity, a reduction in wind speed at the downstream wind turbine 102 owing to the wake effects reduces a corresponding power output. Additionally, the turbulence caused by the wake effects may damage turbine components due to cyclical fatigue loading. For example, fatigue loading may initiate small cracks on surfaces of the turbine components that may increase in size and propagate, thus potentially leading to failure of the downstream wind turbine 102.

Moreover, as independent optimization of the wind turbines may further aggravate wake effects, it is desirable to configure operation of the wind turbines 102 such that the farm-level power output, AEP, and/or fatigue loads in the wind farm 100 remain within corresponding designated thresholds. Particularly, it is desirable to continually adjust the farm-level wake model based on varying values of wake parameters such as wind velocity and direction in real-time such that farm-level performance goals are consistently achieved.

Accordingly, each of the wind turbines 102 includes one or more turbine controllers 106 that regulate the operation of the corresponding wind turbines 102 to mitigate the wake effects between sets of interacting wind turbines 102. In one embodiment, the turbine controllers 106 regulate the operation of the wind turbines 102 based on ambient conditions, user-inputs, and/or commands received from an associated farm controller 108. Accordingly, the turbine controllers 106 may include application-specific processors, programmable logic controller (PLC), digital signal processors (DSPs), microcomputers, microcontrollers, Application Specific Integrated Circuits (ASICs) and/or Field Programmable Gate Arrays (FPGAs).

Furthermore, the turbine controllers 106 may be communicatively coupled to the farm controller 108 and/or a plurality of sensors 110 via a wired and/or wireless communications network 112. The communications network 112, for example, may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks and/or short-range networks.

Moreover, the sensors 110 may provide direct or indirect measurement of wake parameters such as wind speed, wind direction, ambient temperature, pressure, density, turbulence, wind shear, and/or power output of the wind turbines 102. In certain embodiments, the sensors 110 may be positioned within and/or outside the wind farm 100 to measure wake parameters such as supervisory control and data acquisition (SCADA) information including wind experienced and/or expected at the different wind turbines 102. In one embodiment, for example, the sensors 110 may be disposed on or proximal the wind turbines 102 to measure SCADA information corresponding to ambient conditions. The SCADA information may be used by the turbine controllers 106 and/or the farm controller 108 to continually estimate the aerodynamic interactions between sets of interacting wind turbines 102.

Thus, the sensors 110 assist the farm controller 108 in determining various wake effects experienced at the wind turbines 102. The wake effects experienced at a downstream turbine, e.g. $WT_{DOWN}$, result not only from the operation of a corresponding upstream turbine, e.g. $WT_{UP}$, but also from operation of other wind turbines 102 and surrounding terrain in the wind farm 100. Typically, owing to the size and layout of the wind farm 100, the wake effects cascade from an upstream wind turbine 102 to two or more downstream wind turbines 102 that are located in the path of the incoming wind. Accordingly, the farm controller 108 may initially develop a baseline farm-level wake model on historical wake parameters corresponding to reference sets of interacting wind turbines in the wind farm. By providing the baseline farm-level wake model online, the model can be continuously updated in real-time with updated sensor data according to the present disclosure.

Figure 2:
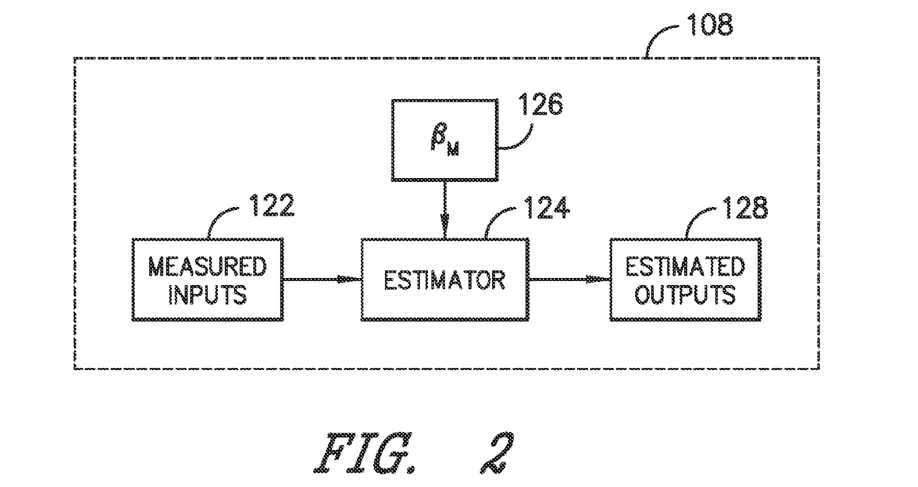
FIG. 2 illustrates a box diagram of one embodiment of a process implemented by a farm controller for developing an online farm-level wake model according to the present disclosure.

More specifically, the farm controller 108 is configured to process the measured values from the sensors 110 to develop and maintain the online farm-level wake model. For example, as shown in FIG. 2, the farm controller 108 continuously receives a plurality of measured real-time sensors signals (e.g. measured inputs 122), including but not limited to rotor speed, pitch angle, and/or power output of the upstream and downstream turbines. For example, the measured inputs 122, as well as the measured wake offset angle $\beta_M$, are filtered through an estimator 124 such as but not limited to a Kalman filter, least squares, a particle filter, or similar to determine the estimated outputs 128 for developing the online farm-level wake model. A Kalman filter, also known as linear quadratic estimation (LQE), is an algorithm that uses a series of measurements observed over time, which typically contains noise, and produces estimates of unknown variables that tend to be more precise than those based on a single measurement alone. In such an embodiment, the upstream dynamics may be independent of the downstream turbine dynamics and the downstream turbine dynamics may be related to the upstream turbine dynamics through the online pair-wise wake model. The estimated outputs 128 may include, for example, rotor speeds for the upstream and downstream wind turbines, the wake meandering component $\eta_\beta$, turbulence at the upstream and downstream wind turbines, pitch angle of the upstream and downstream wind turbines, wind speeds, for the upstream and downstream wind turbines, and/or power output of the upstream and downstream wind turbines.

Figure 3:
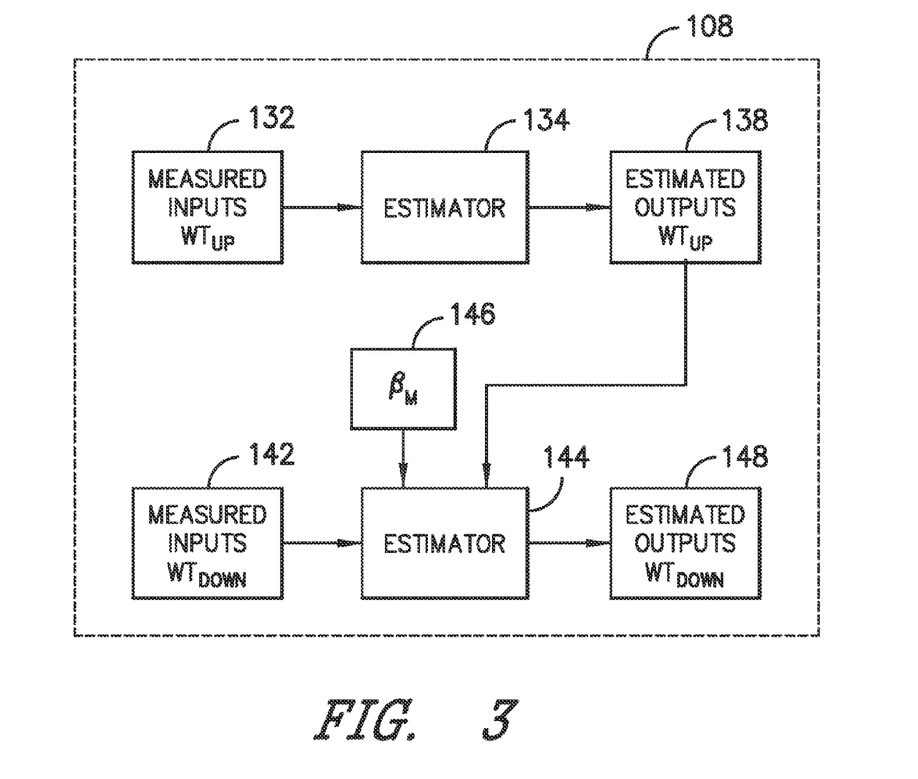
FIG. 3 illustrates a box diagram of another embodiment of a process implemented by a farm controller for developing an online farm-level wake model according to the present disclosure.

Alternatively, as shown in FIG. 3, the upstream turbine dynamics can be "feed-forwarded" as inputs to the downstream turbine. Thus, in one embodiment of the present disclosure, distributed estimation may be utilized by employing separate estimators for the upstream and downstream turbines. More specifically, the measured inputs 132 from the upstream wind turbine $WT_{UP}$ (e.g. rotor speed, pitch angle, and/or power output) may be filtered via Estimator 134 and the estimated outputs 138 (e.g. estimated rotor speed, estimated turbulence, estimated wind speed, estimated pitch angle, and/or estimated power output) from upstream wind turbine $WT_{UP}$ can be used as inputs for the Estimator 144, in addition to the measured inputs $WT_{DOWN}$ 142 (e.g. rotor speed, pitch angle, and/or power output) and the measured wake offset angle $\beta_M$ 146. It should be understood that the Estimators 134, 144 may be any suitable estimator known in the art or described herein, including but not limited to a Kalman filter, least squares, a particle filter, or similar. Thus, the downstream turbine dynamics are related to upstream turbine dynamics through the pair-wise wake model. The estimated outputs $WT_{DOWN}$ 148 may include, for example, the estimated wake meandering component $\eta_\beta$, estimated rotor speed, turbulence, pitch angle, and/or power output.

Figure 4:
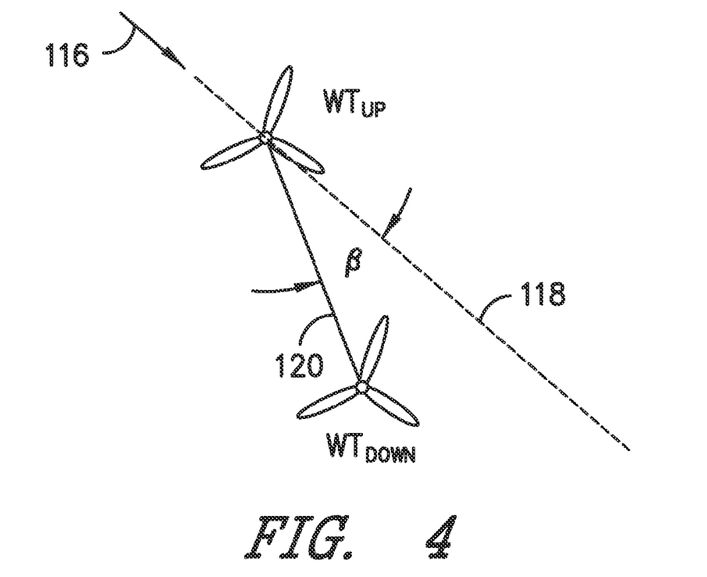
FIG. 4 illustrates a schematic diagram of one embodiment of interacting wind turbines in a wind farm, particularly illustrating the wake offset angle between the interacting wind turbines, according to the present disclosure.
Figure 5:
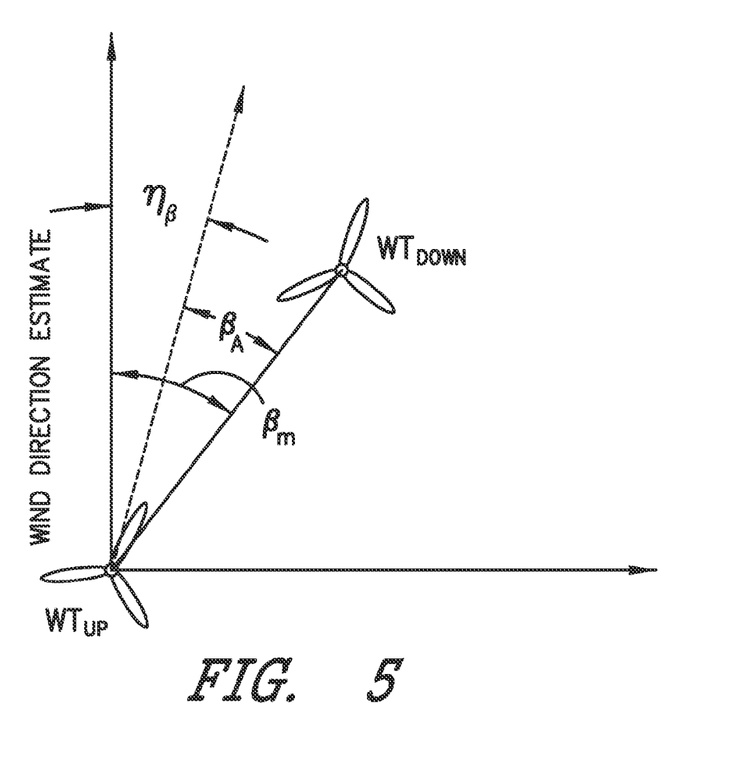
FIG. 5 illustrates a schematic diagram of one embodiment of interacting wind turbines in a wind farm, particularly illustrating the wake offset angle between the interacting wind turbines, including a wake meandering component, according to the present disclosure.
Figure 6:
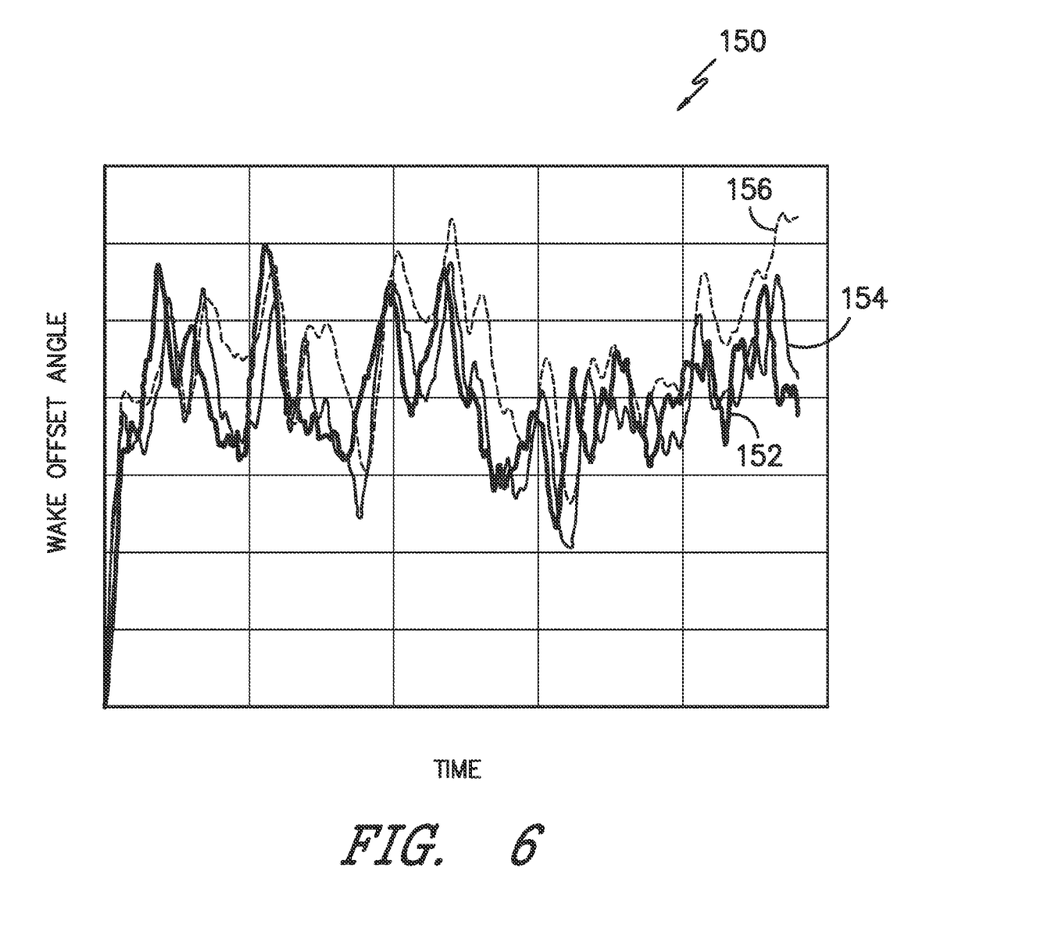
FIG. 6 illustrates a graph of one embodiment of a comparison between the actual wake offset angle and the estimated wake offset angle according to the present disclosure.

The estimated wake meandering component $\eta_\beta$ can be better understood with reference to FIGS. 4-6. As mentioned, one of the inputs to the online pair-wise wake model is the true wake offset angle $\beta$, which is the angle between the center (line 118) of the wake at the downstream wind turbine $WT_{DOWN}$ and line 120 connecting the rotor plane centers of the two interacting wind turbines $WT_{DOWN}$, $WT_{UP}$. However, previous control schemes determined the wake offset angle $\beta$ based on the assumption that the wake center coincides with the average wind direction 116 at the downstream wind turbine $WT_{DOWN}$. Such an assumption, however, fails to account for the meandering component of the wake effects due to lateral components of wind speed. Thus, as shown in FIGS. 4 and 5, the farm controller 108 is configured to determine the true wake offset angle $\beta_A$ between the interacting wind turbines $WT_{DOWN}$, $WT_{UP}$ as a function of a wind direction, a measured wake offset angle $\beta_M$ and a wake meandering component $\eta_\beta$. For example, in one embodiment, the actual wake offset angle $\beta_A$ between the interacting wind turbines may be equal to the sum of the measured wake offset angle $\beta_M$ and the wake meandering component $\eta_\beta$. Thus, the farm controller 108 is configured to develop and continuously update the online farm-level wake model for the interacting wind turbines based at least partially on the monitored wake parameters and the actual wake offset angle $\beta_A$, which takes into account the meandering component of the wake effects due to lateral components of wind speed. Alternatively, the farm controller 108 may be configured to update the wake model independent of the calculation of the actual wake offset angle.

The wake meandering component $\eta_\beta$ may be determined in a variety of ways. For example, in one embodiment, the wake meandering component may be determined as a function of measured wind speed. More specifically, in certain embodiments, the wake meandering component may be estimated online via a noise process, e.g. by modeling the effect of lateral and vertical wind speed components. In another embodiment, as shown in FIGS. 2 and 3, the wake meandering component may be determined via a Kalman filter. Thus, in such embodiments, the farm controller 108 may use an estimator, e.g. a Kalman filter, to estimate upstream and downstream turbine wind speeds and the wake meander noise process component of the wake offset angle. In addition, as mentioned, measurements of upstream and downstream rotor speed, pitch angle, and electrical power may also be used.

Referring particularly to FIG. 6, a graph 150 illustrating various benefits of the present disclosure is depicted. More specifically, the graph 130 illustrates the actual wake offset angle 152 compared to the estimated wake offset angle 154 as determined by the present disclosure, as well as the estimated wake offset angle 156 as determined by previous control technologies. As shown, the estimated wake offset angle 154 as determined by the present disclosure, which includes the wake meandering component $\eta_\beta$, provides a more accurate method of tracking the actual wake offset angle 152 when compared to previous methods calculating the estimated wake offset angle 156. In certain embodiments, for example, the present disclosure provides a 60% improvement in accuracy of the wake offset angle $\beta$ over previous methods.

Figure 7:
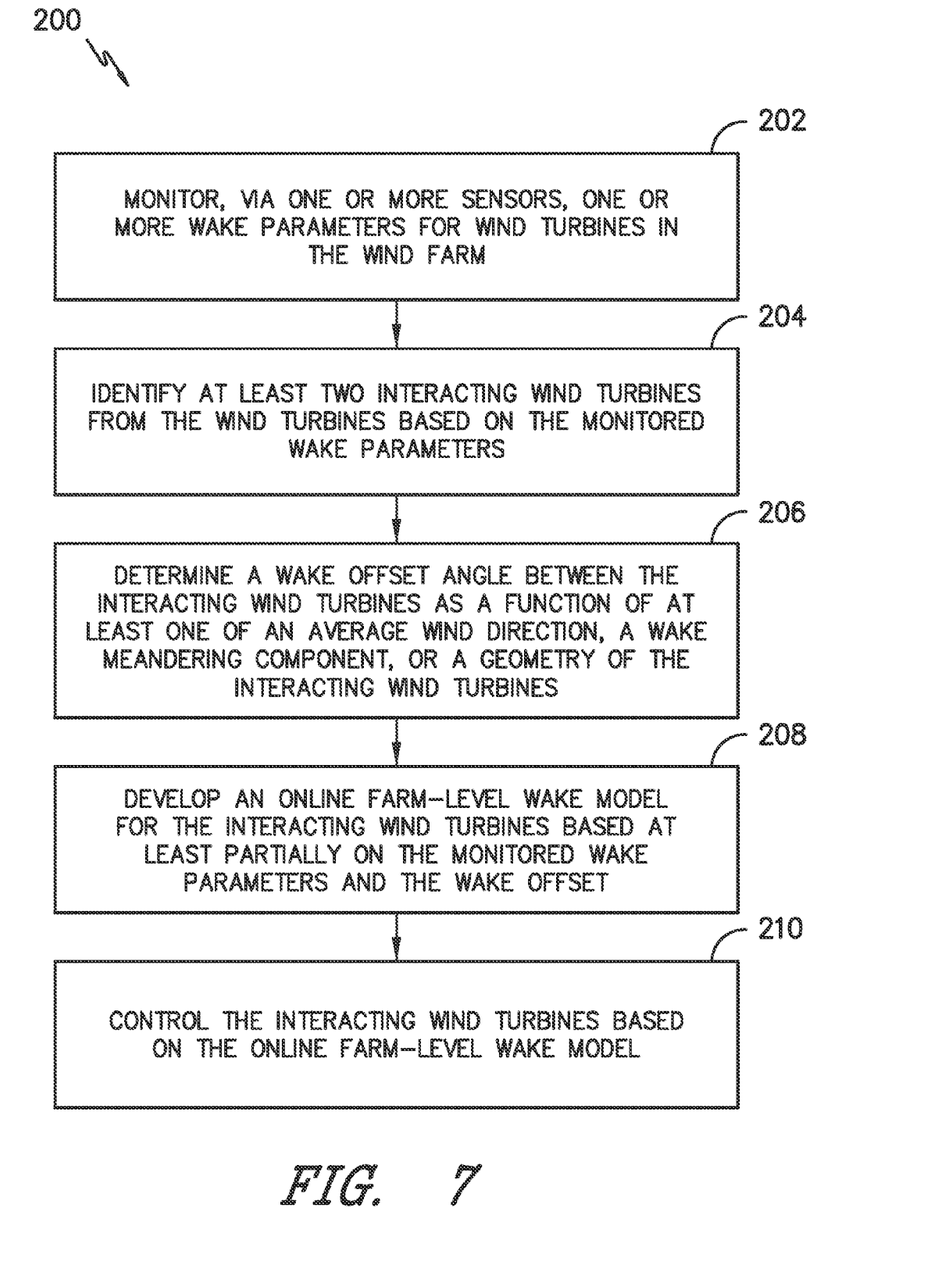
FIG. 7 illustrates a flow diagram of one embodiment of a method for optimizing operation of a wind farm according to the present disclosure.

In further embodiments, the farm controller 108 continuously adapts the online farm-level wake model to control the interacting wind turbines so as to maximize the farm-level power output and/or the AEP in view of varying ambient conditions. FIG. 7 illustrates a flow chart 200 depicting an exemplary method for optimizing operation of a wind farm. In the present specification, embodiments of the exemplary method may be described in a general context of non-transitory computer executable instructions on a computing system or a processor. Generally, computer executable instructions may include routines, programs, objects, components, data structures, procedures, modules, functions, and the like that perform particular functions or implement particular abstract data types.

Additionally, embodiments of the exemplary method 200 may also be practiced in a distributed computing environment where optimization functions are performed by remote processing devices that are linked through a wired and/or wireless communication network. In the distributed computing environment, the computer executable instructions may be located in both local and remote computer storage media, including memory storage devices.

Further, in FIG. 7, the exemplary method 200 is illustrated as a collection of blocks in a logical flow chart, which represents operations that may be implemented in hardware, software, or combinations thereof. The order in which the exemplary method is described is not intended to be construed as a limitation, and any number of the described blocks may be combined in any order to implement the exemplary method disclosed herein, or an equivalent alternative method. Additionally, certain blocks may be deleted from the exemplary method or augmented by additional blocks with added functionality without departing from the spirit and scope of the subject matter described herein.

As shown in FIG. 7, a flow diagram of the method 200 for optimizing operation of a wind farm is illustrated. The method 200 begins at step 202, where one or more sensors monitor one or more wake parameters for wind turbines in the wind farm. In one embodiment, the wake parameters, as previously noted, include ambient conditions, control settings for individual wind turbines, the geometric layout of the wind farm, and/or any parameter that may affect operational efficiency of the individual wind turbines and/or the overall wind farm. In certain embodiments, only certain wake parameters such as the upstream wind speed, the downstream wind speed, the wind direction, control settings, and/or operating or non-operating states of the turbines are received continually. Other wake parameters, e.g. the geometrical layout of the wind farm, may be received only once or may be retrieved from a storage device.

Although, several wake parameters may be simultaneously monitored in a wind farm, in the present disclosure, different subsets of wake parameters may be selected for different operating conditions, such as during day or night time, during calm or storm conditions, and/or for optimizing different performance goals. In one exemplary implementation that aims to maximize a farm-level power output, the subset of wake parameters include values corresponding to a pitch angle, tip speed ratio, and wind speed corresponding to the upstream wind turbine, and a wind speed at a corresponding downstream turbine segregated for each reference set. In another embodiment, the wind speeds may be directly measured or estimated from turbine power, rotor speed and pitch angle measurements. In further embodiments, the segregated values are processed to filter out noisy data such as when the tip speed ratio is above or below designated thresholds to provide for more accurate modeling of the historical values of the wake parameters.

Further, at step 204, at least two interacting wind turbines are identified from the wind turbines in the wind farm based on the monitored wake parameters. Particularly, in one embodiment, the farm controller 108 may be configured to identify the interacting wind turbines based on the prevailing wind direction and the geometrical layout of the wind farm. Additionally, the farm controller 108 can use the geometrical layout of the wind farm 100 to determine neighboring turbines and/or relative positions of the wind turbines 102 for a detected wind direction. The relative positions, in turn, may allow identification of sets of interacting wind turbines such that each set includes at least one upstream wind turbine and at least one downstream wind turbine experiencing the wake effects.

Alternatively, in certain embodiments, the farm controller 108 may employ an engineering wake model such as the Jensen or Ainslie model to identify the sets of aerodynamically interacting wind turbines. Generally, the Jensen or Ainslie models may identify the reference sets of interacting wind turbines, for example, based on relative locations of neighboring turbines, a coefficient of thrust of each wind turbine 102, and/or the prevailing wind conditions. Specifically, the Jensen Model may predict a velocity deficit at the downstream wind turbine, for example, based on a wind speed, a wind direction, and a thrust coefficient corresponding to the upstream wind turbine, and a location of the downstream wind turbine. The velocity deficit is representative of wake interactions between two wind turbines, and thus, aids in identifying the reference sets of interacting wind turbines.

Moreover, at step 206, the farm controller 108 determines a wake offset angle between the interacting wind turbines as a function of a measured wake offset angle and the wake meandering component, discussed above. For example, as mentioned, the wake meandering component may be determined as a function of measured wind speed. More specifically, in certain embodiments, the wake meandering component may be estimated online via a noise process, e.g. by modeling the noise of one or more wake parameters from the interacting wind turbines. In another embodiment, the wake meandering component may be determined via a Kalman filter, which estimates upstream and downstream turbine wind speeds and the wake meander noise process component of the wake offset angle. In addition, measurements of upstream and downstream rotor speed, pitch angle, and electrical power may also be used.

Further, at 208, the farm controller 108 develops one or more online farm-level wake models for the reference sets of interacting wind turbines based at least partially on the monitored wake parameters and the wake offset angle. As used herein, the terms "set" or "sets" are used to refer to a group of two or more quantities. Particularly, in one embodiment, each of the sets of wind turbines corresponds to a pair of wind turbines. In other embodiments, however, each of the sets may include three or more wind turbines. It may be noted that wake effects occur in a set-wise manner between sets of interacting downstream and corresponding upstream turbines for a particular wind direction. A set-wise estimation of the wake effects is then aggregated to provide an estimation of the farm-level wake effect. This set-wise estimation is determined using the one or more historical wake models generated for each reference set.

Additionally, at step 210, the farm controller 108 is configured to control the interacting wind turbines based on the online farm-level wake model. More specifically, the wake model can be adapted and/or continually updated based on a generic initial model, using signals from the sensors 110. Thus, the wake model of the present disclosure is capable of providing more accurate control settings based on actual site conditions.

It may be noted that the foregoing examples, demonstrations, and process steps that may be performed by certain components of the present systems, for example by the turbine controllers 106 and/or farm controller 108 of FIG. 1 may be implemented by suitable code on a processor-based system. To that end, the processor-based system, for example, may include a general-purpose or a special-purpose computer. It may also be noted that different implementations of the present disclosure may perform some or all of the steps described herein in different orders or substantially concurrently.

Additionally, the functions may be implemented in a variety of programming languages, including but not limited to Ruby, Hypertext Preprocessor (PHP), Perl, Delphi, Python, C, C++, or Java. Such code may be stored or adapted for storage on one or more tangible, machine-readable media, such as on data repository chips, local or remote hard disks, optical disks (that is, CDs or DVDs), solid-state drives, or other media, which may be accessed by the processor-based system to execute the stored code.

Although specific features of embodiments of the present disclosure may be shown in and/or described with respect to some drawings and not in others, this is for convenience only. It is to be understood that the described features, structures, and/or characteristics may be combined and/or used interchangeably in any suitable manner in the various embodiments, for example, to construct additional assemblies and methods for use in wind farm optimization.

While only certain features of the present disclosure have been illustrated and described herein, many modifications and changes will occur to those skilled in the art. It is, therefore, to be understood that the appended claims are intended to cover all such modifications and changes as fall within the true spirit of the invention.

What is claimed is:

1. A method for optimizing operation of a wind farm, the method comprising:
   providing a farm-level wake model for the wind farm based on historical wake parameters corresponding to reference sets of interacting wind turbines in the wind farm;
   monitoring one or more real-time wake parameters for wind turbines in the wind farm;
   identifying at least two interacting wind turbines from the reference sets of interacting wind turbines based on the real-time wake parameters;
   determining a wake offset angle between the two interacting wind turbines as a function of an average wind direction and a wake meandering component, the wake meandering component corresponding to a shift in a wake track due to lateral components of wind speed;
   continuously updating the farm-level wake model online based at least partially on the real-time wake parameters; and
   controlling the interacting wind turbines based on the updated farm-level wake model.

2. The method of claim 1, further comprising determining the wake offset angle between the two interacting wind turbines as a function of the average wind direction, a geometry between the two interacting wind turbines, and a wake meandering component.

3. The method claim 1, wherein the wake offset angle comprises the angle between a projection of a wake center on a downstream turbine rotor plane a line joining the interacting wind turbines.

4. The method of claim 1, further comprising determining the wake meandering component in real-time as a function of measured wind direction.

5. The method of claim 1, further comprising determining the wake meandering component via an estimator.

6. The method of claim 5, wherein the estimator comprises at least one of a Kalman filter, least squares, or a particle filter.

7. The method of claim 1, further comprising measuring, via one or more sensors, real-time operating data for the interactive wind turbines and continuously updating the farm-level wake model based at least partially on the operating data and the monitored wake parameters.

8. The method of claim 7, wherein the operating data further comprise at least one of rotor speed, generator speed, pitch angle, torque output, or power output.

9. The method of claim 1, wherein the wake parameters comprise at least one of wind direction, wind speed at an upstream wind turbine, wind speed at a downstream wind turbine, wind turbulence, wind shear, wind veer, ambient temperature, pressure, humidity, a tip speed ratio, a yaw misalignment, geometrical layout information of the wind farm or combinations thereof.

10. The method of claim 1, wherein each of the interacting sets of wind turbines comprises a pair of wind turbines.

11. A method for optimizing operation of a wind farm, the method comprising:
    monitoring, via one or more sensors, one or more wake parameters for wind turbines in the wind farm;
    identifying at least two interacting wind turbines from the wind turbines based on the monitored wake parameters;
    determining a wake offset angle between the interacting wind turbines as a function of at least an average wind direction, a direction of alignment between the two interacting wind turbines, and a wake meandering component, the wake meandering component corresponding to a shift in a wake track due to lateral components of wind speed;
    developing a farm-level wake model for the interacting wind turbines based at least partially on the monitored wake parameters and the wake offset angle; and
    controlling the interacting wind turbines based on the farm-level wake model.

12. The method of claim 11, wherein the wake offset angle comprises, at least, an angle between a projection of a wake center on a downstream turbine rotor plane a line joining the interacting wind turbines.

13. The method of claim 11, further comprising determining the wake meandering component in real-time as a function of measured wind speed.

14. The method of claim 11, further comprising determining the wake meandering component via an estimator.

15. The method of claim 11, further comprising measuring, via one or more sensors, real-time operating data for the interactive wind turbines and continuously updating the farm-level wake model based at least partially on the operating data and the monitored wake parameters.

16. The method of claim 15, wherein the operating data further comprise at least one of rotor speed, generator speed, pitch angle, torque output, or power output.

17. The method of claim 11, wherein the wake parameters comprise at least one of wind direction, wind speed at an upstream wind turbine, wind speed at a downstream wind turbine, wind turbulence, wind shear, wind veer, ambient temperature, pressure, humidity, a tip speed ratio, a yaw misalignment, geometrical layout information of the wind farm or combinations thereof.

18. A system for optimizing operation of a wind farm, comprising:
- one or more sensors configured to measure a plurality of wake parameters for one or more of the plurality of wind turbines in the wind farm; and
- a farm controller operatively coupled to the one or more sensors, the farm controller configured to perform one or more operations, the operations comprising:
- identifying at least two interacting wind turbines from the wind turbines based on the monitored wake parameters;
- determining a wake offset angle between the interacting wind turbines as a function of at least an average wind direction and a wake meandering component, the wake meandering component corresponding to a shift in a wake track due to lateral components of wind speed;
- developing a farm-level wake model for the interacting wind turbines based at least partially on the monitored wake parameters and the wake offset angle; and
- controlling the interacting wind turbines based on the farm-level wake model.

19. The system of claim 18, wherein the one or more sensors comprise at least one of miniature inertial measurement units (MIMUs), strain gauges, accelerometers, proximity sensors, pressure sensors, angle of attack sensors, vibration sensors, Light Detection and Ranging (LIDAR) sensors, camera systems, fiber optic systems, anemometers, wind vanes, Sonic Detection and Ranging (SODAR) sensors, infra lasers, radiometers, pitot tubes, rawinsondes, rotor speed encoders, pitch angle encoders, electrical power transducers, or yaw position encoders.

20. The system of claim 18, wherein the farm controller is further configured to determine the wake meandering component in real-time as a function of measured wind direction.

* * * * *